US008667604B2

(12) United States Patent
Karki et al.

(10) Patent No.: US 8,667,604 B2
(45) Date of Patent: Mar. 4, 2014

(54) PROTECTION OF SOFTWARE ON PORTABLE MEDIUM

(75) Inventors: Mukesh Karki, Bellevue, WA (US); Yusuf Atas, Redmond, WA (US); Bhrighu Sareen, Redmond, WA (US); Serdar Unal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1197 days.

(21) Appl. No.: 11/854,565

(22) Filed: Sep. 13, 2007

(65) Prior Publication Data

US 2009/0077671 A1    Mar. 19, 2009

(51) Int. Cl.
*G06F 7/04* (2006.01)
*G06F 17/30* (2006.01)
*G06F 13/00* (2006.01)
*G06F 13/28* (2006.01)
*H04N 7/16* (2011.01)

(52) U.S. Cl.
USPC ............... 726/27; 726/30; 711/100; 711/101; 711/115

(58) Field of Classification Search
USPC ........................ 726/26–30; 711/100, 101, 115
See application file for complete search history.

(56) References Cited

U.S. PATENT DOCUMENTS

| 4,544,833 | A | 10/1985 | Ugon |
| 5,357,573 | A | 10/1994 | Walters |
| 6,931,542 | B1 | 8/2005 | Gregoire |
| 7,024,696 | B1 | 4/2006 | Bahar |
| 7,055,040 | B2 | 5/2006 | Klemba et al. |
| 7,549,161 | B2 * | 6/2009 | Poo et al. ........................ 726/5 |
| 8,181,006 | B2 * | 5/2012 | Charles et al. .................. 713/2 |
| 2003/0053336 | A1 | 3/2003 | Egawa |
| 2003/0074294 | A1* | 4/2003 | Merkin et al. ................. 705/36 |
| 2004/0059938 | A1 | 3/2004 | Hughes et al. |
| 2005/0206353 | A1* | 9/2005 | Sengoku ...................... 323/210 |
| 2006/0021067 | A1 | 1/2006 | Jindal et al. |
| 2006/0036552 | A1 | 2/2006 | Gunyakti et al. |
| 2006/0059571 | A1 | 3/2006 | Chen et al. |
| 2006/0242081 | A1 | 10/2006 | Ivanov et al. |
| 2006/0288422 | A1 | 12/2006 | Liu et al. |

(Continued)

FOREIGN PATENT DOCUMENTS

| KR | 1020040097436 A | 11/2004 |
| KR | 1020050083117 A | 8/2005 |
| WO | WO2006101765 A2 | 9/2006 |

OTHER PUBLICATIONS

Naumovich, et al., "Preventing Piracy, Reverse Engineering, and Tampering", vol. 36, Issue 7, Jul. 2003, IEEE, 2003, pp. 64-71.

(Continued)

*Primary Examiner* — Edan Orgad
*Assistant Examiner* — Jahangir Kabir
(74) *Attorney, Agent, or Firm* — Chin IP, PLLC; Davin Chin

(57) ABSTRACT

A portable rewritable medium and a method are provided for preventing unauthorized use of executable software stored on the portable rewritable medium. A portion of the software stored on the portable rewritable medium may include instructions for a processing device to determine whether execution of the executable software is permitted. If execution of the executable software is permitted, the processing device may execute the executable software directly from the portable rewritable medium. Characteristics of the portable rewritable medium may be checked to determine whether functionality of the executable software is to be limited.

20 Claims, 10 Drawing Sheets

(56) References Cited

U.S. PATENT DOCUMENTS

| 2007/0014414 | A1 | 1/2007 | Benedikt |
| 2007/0041584 | A1 | 2/2007 | O'Connor et al. |
| 2007/0143529 | A1* | 6/2007 | Bacastow ................ 711/103 |
| 2008/0148410 | A1* | 6/2008 | Wilson .................... 726/26 |
| 2008/0163208 | A1* | 7/2008 | Burr et al. .................. 718/1 |
| 2009/0043963 | A1* | 2/2009 | Lahcanski et al. ........... 711/115 |

OTHER PUBLICATIONS

Anckaert, et al., "Software Piracy Prevention through Diversity", DRM'04, Oct. 25, 2004, ACM, pp. 63-71.

PCT/US2008/071449, International Search Report and Written Opinion (for corresponding international application), mailed Feb. 19, 2009.

Schneier, Bruce; "Inside the PCMCIA Storage Standard", MacWeek, Jan. 11, 1993, <retrieved at "http://www.schneier.com/essay-357.html">.

Office Action for corresponding Chinese patent application 200880107267.3, mailed Apr. 5, 2012.

Chinese Decision on Rejection from CN App. No. 200880107267.3 (MS#321122.04), Dispatched Aug. 9, 2012, 10 pages, including English summary/partial translation.

Chinese First Office Action from CN App. No. 200880107267.3 (MS#321122.04), Dispatched Sep. 26, 2011, 10 pages, including English summary/partial translation.

* cited by examiner

PROTECTION OF SOFTWARE ON PORTABLE MEDIUM

BACKGROUND

Flash storage devices may store information thereon, such as music, data, or other information. Over the last several years, flash storage devices have become less expensive. As a result, flash storage devices are being used more frequently to electronically store information.

Currently, executable software may be shipped to users on portable media, such as, for example, compact disc (CD), digital video disc (DVD), or other portable media. Without any type of protective measures, users may use the portable media, or may use unauthorized copies of the portable media, to install and execute pirated or unlicensed software on processing devices. As a result, software vendors may realize decreased revenue.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a removable rewritable medium may be provided. The removable rewritable medium may have executable software stored therein. The executable software may include a portion having instructions for a processing device to determine whether execution of the software is permitted. The software may be executed directly from the removable rewritable medium by a processing device. In some embodiments, characteristics of the removable rewritable medium may be checked, and based on the characteristics of the removable rewritable medium, functionality of the software may be limited or disabled. Further, characteristics of the processing device may be checked, and based on the characteristics of the processing device, functionality of the software may be limited or disabled.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
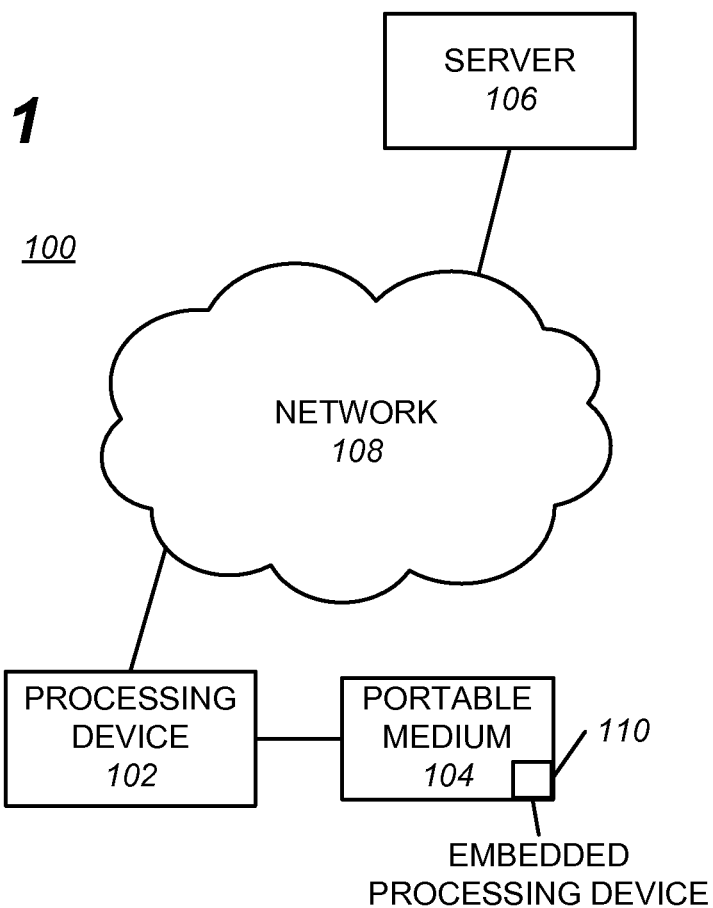
FIG. 1 illustrates an exemplary operating environment for embodiments consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a rewritable removable medium, such as, for example, a flash storage device, or other rewritable removable medium, may include executable software, such as, for example, a software application, an operating system, or other executable software, for a processing device. A portion of the executable software may include instructions for the processing device to determine whether execution of the executable software stored on the rewritable removable medium is permitted. After the processing device executes the portion of the executable software, the processing device may execute the executable software directly from the rewritable removable medium only when execution of the portion of the executable software results in a determination that the execution of the executable software is permitted. In other words, the processing device may execute the executable software directly from the rewritable removable medium without installing the executable software on the processing device. Further, in some embodiments consistent with the subject matter of this disclosure, the processing device may access information with respect to characteristics of the rewritable removable medium. The characteristics may include medium type, brand, medium speed, medium storage capacity, medium features (encryption, public-private keys, or other or different features), or other characteristics. In cases where a determination is made to permit execution of the executable software directly from the rewritable removable medium, functionality of the executable software may be changed based upon the accessed information with respect to the characteristics of the rewritable removable medium.

In various embodiments, a number of different techniques may be employed to determine whether to permit execution by the processing device of the executable software stored on the rewritable removable medium. For example, the rewritable removable medium may include information regarding a class of processing device which may be permitted to execute the executable software. In such an embodiment, the executable software may execute only on processing devices included in the class of processing devices. The class, or classes, of processing devices, may be indicated by one or more values, which may provide information regarding a manufacturer of a processor included in the processing device, a specific type of processor included in the processing device, a processor speed, or other or different characteristics of the processing device.

In some embodiments, upon a first execution of the executable software from the rewritable removable medium, information regarding the processing device may be stored on the rewritable removable medium, thus associating the processing device with the rewritable removable medium. Subsequent executions of the executable software from the rewritable removable medium may be permitted only when the rewritable removable medium is associated with the processing device. Execution of the executable software may be prevented when the rewritable removable medium is not associated with the processing device.

In some embodiments, a valid tamper proof ID may be previously installed on the processing device. Execution of the executable software from the rewritable removable medium may be permitted only when existence of the valid tamper proof ID is verified.

In some embodiments, the processing device may execute the portion of the executable software from the rewritable removable medium to submit a data object to be digitally signed by an embedded processing device included in the rewritable removable medium. The processing device may be permitted to execute the executable software from the rewritable removable medium only when the embedded processing device provides a valid signature for the provided data object.

In some embodiments, the processing device may send product information and processing device information to a second processing device, such as a server, or other processing device. Periodically, the processing device may request and receive processing device information associated with the product information, which the processing device may compare with processing device information, stored in the rewritable removable medium, from the processing device. If a comparison reveals a change in the processing device information from the second processing device, an action may be performed, such as, for example, disabling or reducing functionality of the executable software, or performing another action.

In some embodiments, a combination of the above mentioned techniques, or other techniques, may be employed to determine whether execution of the executable software from the rewritable removable medium may be permitted.

Exemplary Operating Environment

FIG. 1 illustrates an exemplary operating environment 100 for embodiments consistent with the subject matter of this disclosure. Operating environment 100 may include a processing device 102, a portable medium 104, one or more servers 106, a network 108, and an embedded processing device 110, included as part of portable medium 104.

Network 108 may be a single network or a combination of networks, such as, for example, the Internet or other networks. Network 108 may include a wireless network, a wired network, a packet-switching network, a public switched telecommunications network, a fiber-optic network, other types of networks, or any combination of the above.

Processing device 102 may be a user's processing device, such as, for example, a desktop personal computer (PC), a laptop PC, a handheld processing device, or other processing device.

Portable medium 104 may be a rewritable removable medium, such as, for example, a universal serial bus (USB) flash RAM device, a secure digital (SD) card, or other medium, which may be removably connected to processing device 102. In some embodiments, portable medium 104 may include embedded processing device 110. In embodiments in which portable medium 104 is a USB flash RAM device, the USB flash RAM device may be removably connected to processing device 102 via a USB port of processing device 102. In embodiments in which portable medium 104 is a SD card, the SD card may be removably connected to processing device 102 via a SD card port of processing device 102.

Server 106 may be a processing device or a group of processing devices configured to work together. In embodiments in which server 106 includes a group of processing devices, the processing devices may be configured as a server farm.

Exemplary Processing Device

Figure 2:
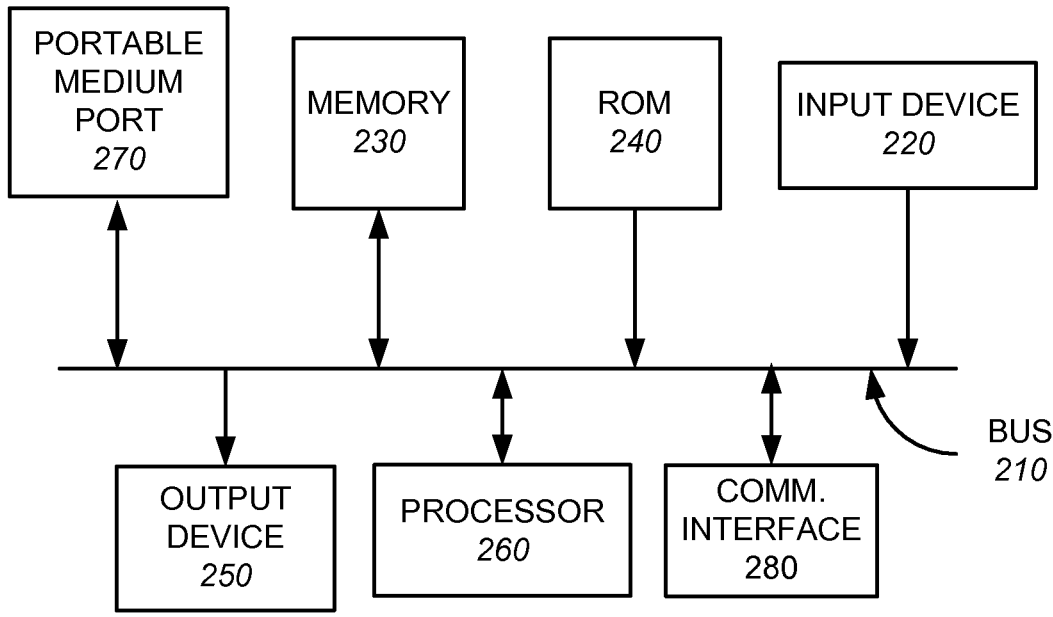
FIG. 2 is a functional block diagram of a processing device, which may be used to implement a processing device or a server consistent with the subject matter of this disclosure.

FIG. 2 is a functional block diagram that illustrates an exemplary processing device 200, which may be used to implement embodiments of processing device 102 and/or server 106 consistent with the subject matter of this disclosure.

Processing device 200 may include a bus 210, an input device 220, a memory 230, a read only memory (ROM) 240, an output device 250, a processor 260, a portable medium port 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Portable medium port 270 may provide a means for connecting a medium, such as, for example, portable medium 104, to processing device 100. Portable medium 104 may store data and/or instructions for a processor, such as, for example, processor 260. In some embodiments of processing device 102, portable medium 104 may be an only storage medium of processing device 102.

Input device 220 may include a keyboard or other input device. Output device 250 may include one or more conventional mechanisms that output information, including one or more display screens, or other output devices.

Communication interface 280 may include a transceiver for transmitting and receiving information to or from network 108. Communication interface 280 may transmit and receive information via a wireless or wired connection.

When embedded processing device 110 is implemented by processing device 200, processing device 110 may include memory 230, ROM 240, bus 210, and processor 260.

Processing device 200 may perform such functions in response to processor 260 executing sequences of instructions contained in a tangible machine-readable medium, such as, for example, memory 230, ROM 240, portable medium 104, or other medium. Such instructions may be read into memory 230 from another machine-readable medium or from a separate device via communication interface 280.

Exemplary Processes

Figure 3:
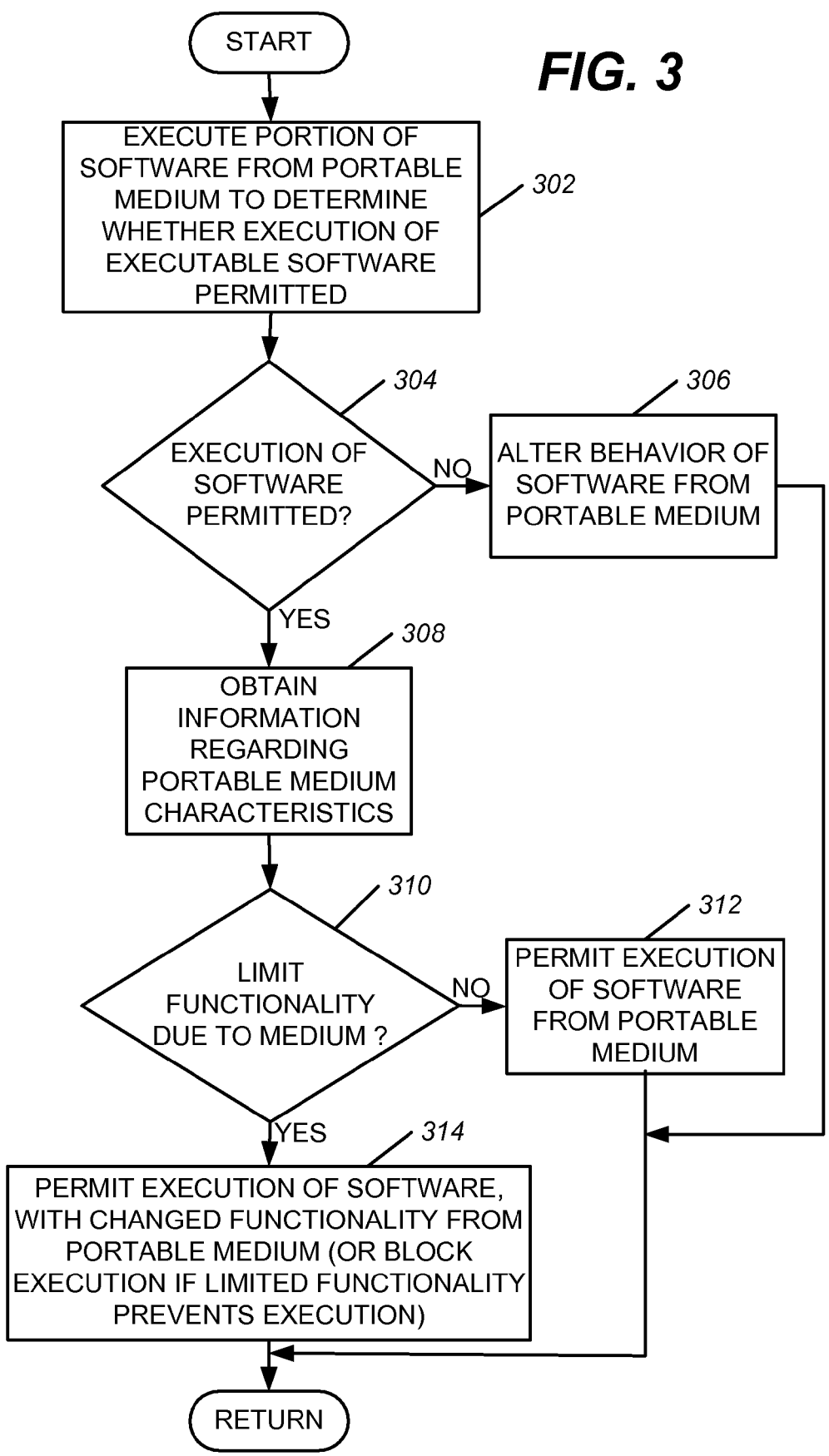
FIG. 3 is a flowchart illustrating exemplary processing for determining whether execution of software stored on a portable medium is permitted by a processing device.

FIG. 3 is a flowchart illustrating an exemplary process, which may be performed in embodiments consistent with the subject matter of this disclosure. The process may begin with a processing device, such as, for example, processing device 102, executing a portion of software stored on a rewritable removable medium, such as, for example, portable medium 104, connected to processing device 102 (act 302). The portion of software may include instructions for a processor, such as, for example, processor 260 of processing device 102, to determine whether execution of executable software stored on portable medium 104 is permitted by the processing device 102.

In various embodiments, numerous methods or techniques may be employed to determine whether processing device 102 is permitted to execute the executable software stored on portable medium 104 (act 302). Exemplary methods, which may be implemented in different embodiments, are illustrated by the flowcharts of FIGS. 4-10.

Figure 4:
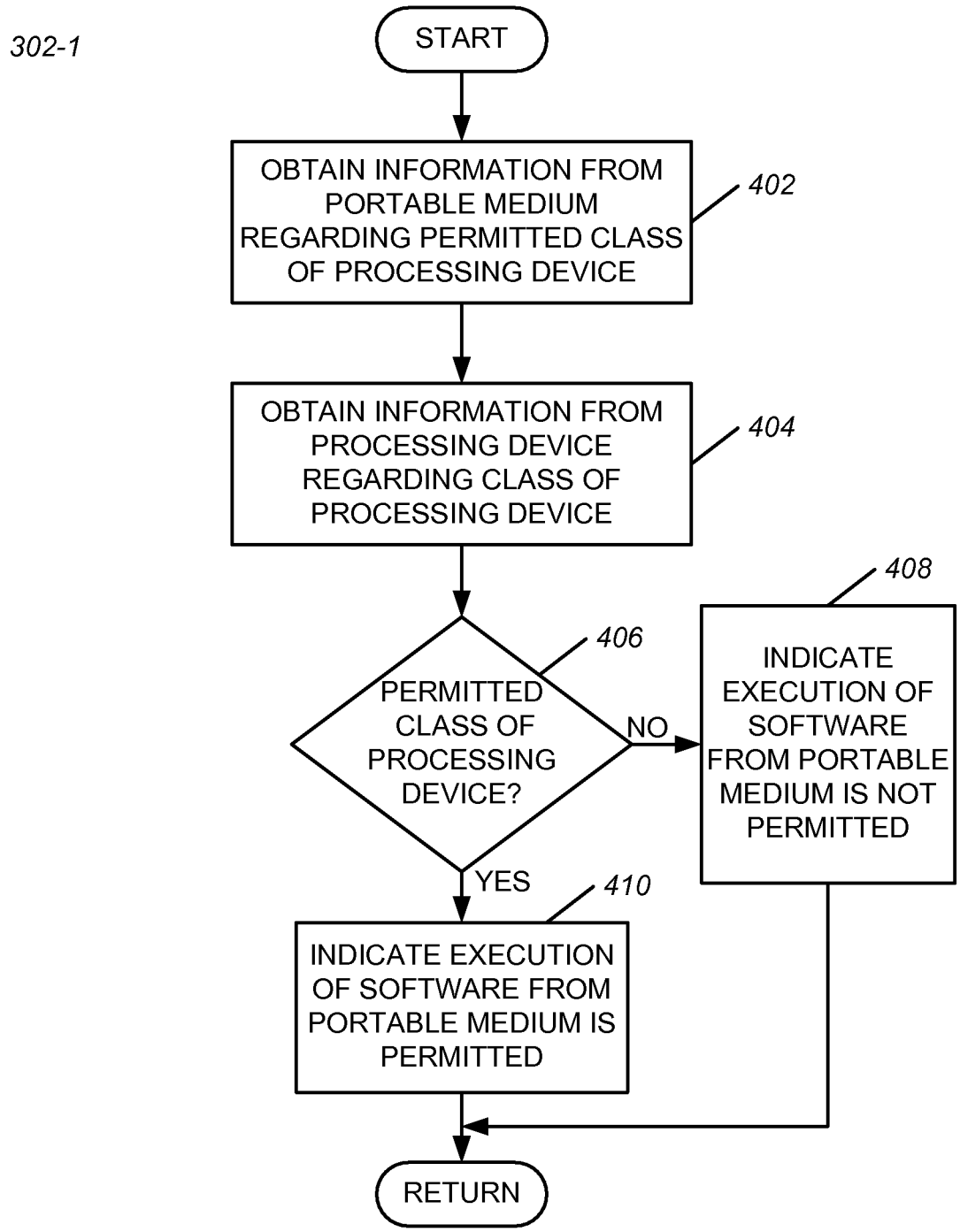
FIGS. 4-11 are flowcharts illustrating exemplary processes for performing act 302 of FIG. 3 in embodiments consistent with the subject matter of this disclosure.

FIG. 4 is a flowchart illustrating one exemplary method 302-1 for performing act 302 of FIG. 3. Executing the portion of the software from portable medium 104, processing device 102 may obtain information from portable medium 104 regarding a class of processing device permitted to execute the executable software stored on portable medium 104 (act 402). In some embodiments, a software vendor may provide portable medium 104 with predefined information stored therein, indicating a class, or classes of processing device, for which execution of the executable software is permitted. The class, or classes, of processing devices, may be indicated by one or more values, which may provide information regarding a manufacturer of a processor included in the processing device, a specific type of processor included in the processing device, a processor speed, or other or different characteristics of the processing device.

Next, processing device 102 may execute instructions, from the portion of the software included in portable medium 104, to obtain information from processing device 102 regarding a class of processing device 102 (act 404). Processing device 102 may then determine whether the class of processing device 102 is a class for which execution of the executable software is permitted by comparing the class of processing device 102 with the predefined information stored in portable medium 104 (act 406). If the class of processing device 102 is determined to be a class of processing device permitted to execute the executable software, then processing device 102 may provide an indication that execution of the executable software from portable medium 104 is permitted (act 410). If the class of processing device 102 is determined to be a class of processing device not permitted to execute the executable software, then processing device 102 may provide an indication that execution of the executable software from portable medium 104 is not permitted (act 408).

Figure 5:
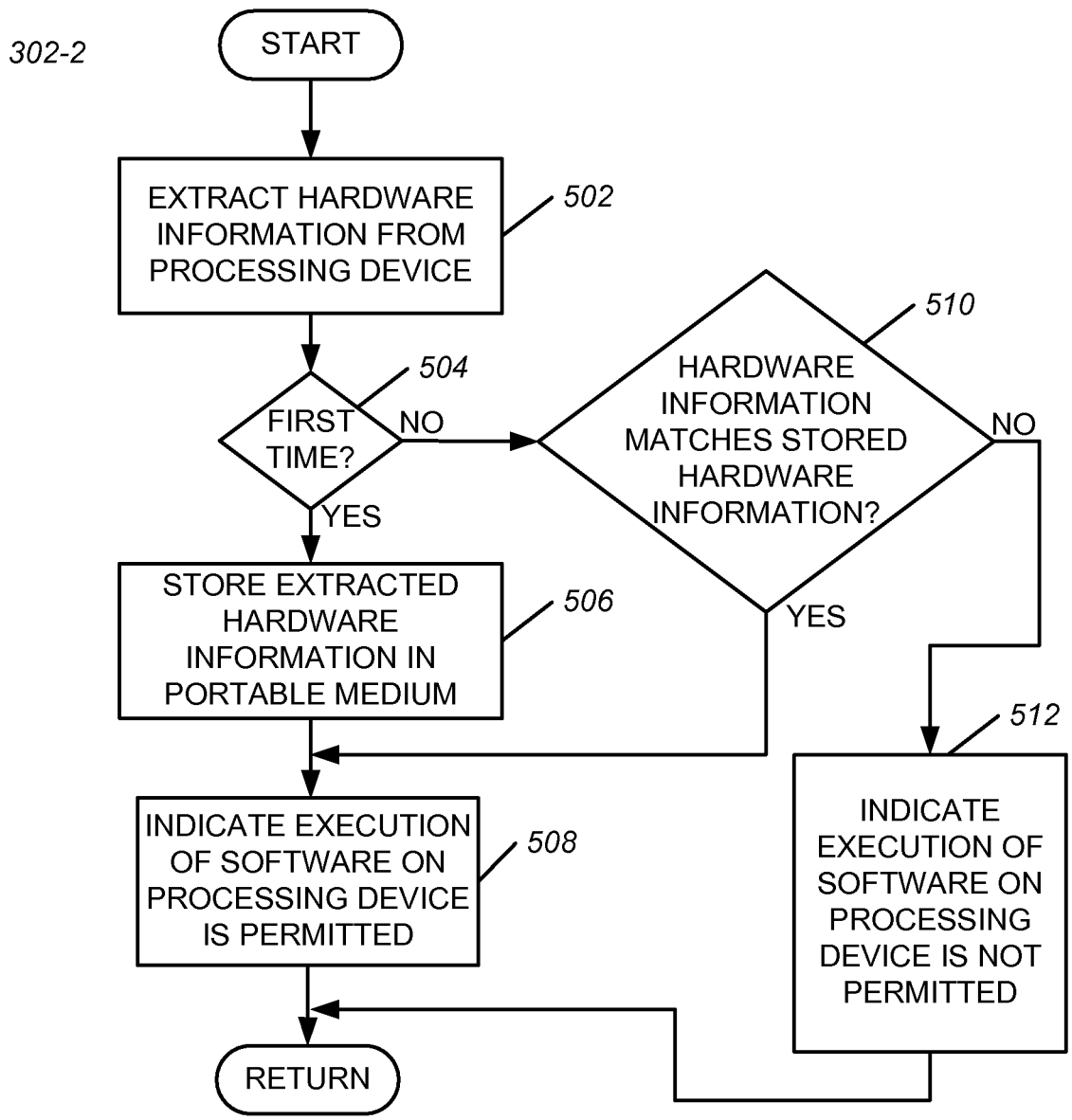

FIG. 5 is a flowchart illustrating a second exemplary method 302-2 for performing act 302 of FIG. 3. Executing the portion of the software from portable medium 104, processing device 102 may extract hardware information from processing device 102 (act 502). The extracted hardware information may act as an identifier of processing device 102. The extracted hardware information may include information specific to processing device 102, such as, for example, key pieces of a unique hardware ID, a media access control (MAC) address of a network card, a system management basic input/output system (SMBIOS) globally unique identifier (GUID) of basic input/output (BIOS) firmware, or other information.

Processing device 102 may then determine whether this is a first attempt to execute the executable software stored in portable medium 104 (act 504). Processing device 102 may make this determination based on an indicator or flag stored in portable medium 104, in one embodiment. In another embodiment, processing device 102 may make this determination based on information stored during act 506, discussed below.

If processing device 102 determines that this is a first attempt to execute the executable software stored in portable medium 104, then processing device 102 may store the extracted hardware information in portable medium 104 (act 506). In some embodiments, the extracted hardware information may be stored in an encrypted form in portable medium 104. Processing device 102 may then provide an indication that execution of the executable software on processing device 102 is permitted (act 508).

If, during act 504, processing device 102 determines that this is not a first attempt to execute the executable software stored in portable medium 104, then processing device 102 may determine whether the extracted hardware information matches previously stored hardware information included in portable medium 104 (act 510). If the extracted hardware information is determined to match the previously stored hardware information, then processing device 102 may provide an indication that execution of the executable software on processing device 102 is permitted (act 508). Otherwise, processing device 102 may provide an indication that execution of the executable software is not permitted on processing device 102 (act 512).

Figure 6:
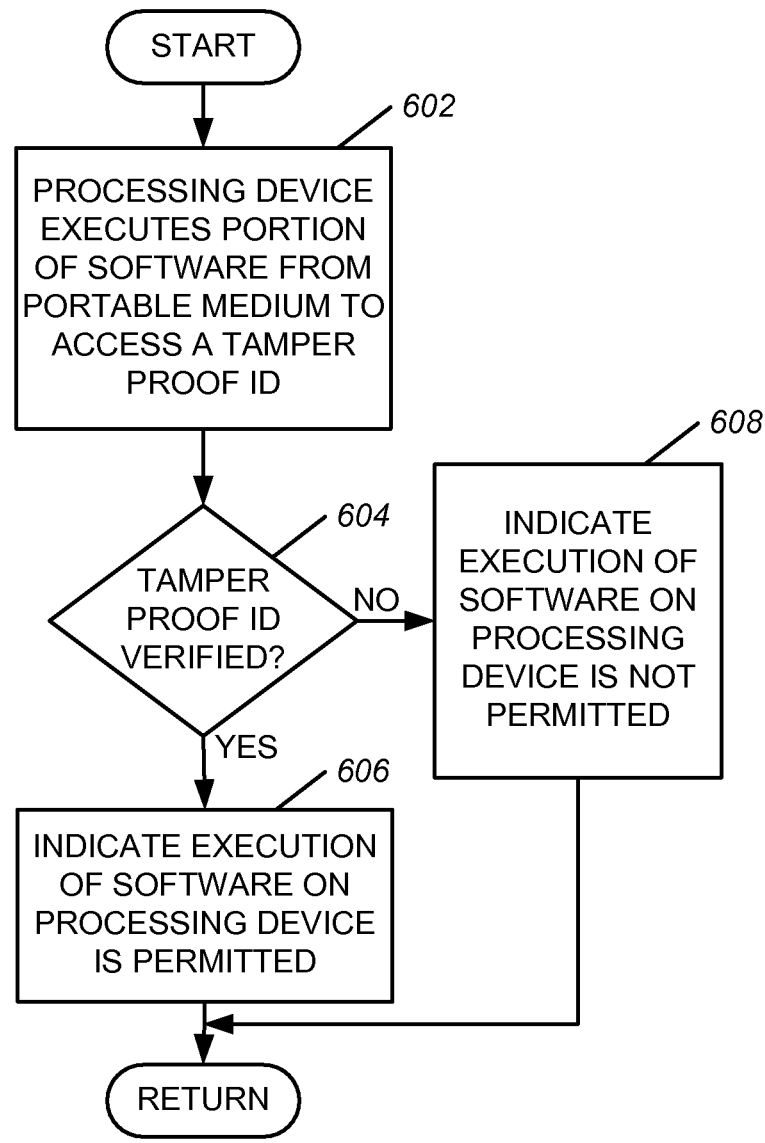

FIG. 6 is a flowchart illustrating a third exemplary method 302-3 for performing act 302 of FIG. 3. In this embodiment, a tamper proof ID may be stored on processing device 102. In one implementation, the tamper proof ID may be a certificate, which is digitally signed with a private key of a software developer. The tamper proof ID may be provided by the software developer to an original equipment manufacturer (OEM) of processing device 102. The OEM may burn the tamper proof ID into ROM 240 of processing device 102.

The process may begin with processing device 102 executing the portion of software from portable medium 104 to access the tamper proof ID (act 602). Next, processing device 102 may verify a validity of the tamper proof ID (act 604). In one implementation in which the tamper proof ID is digitally signed using a private key of a software developer, processing device 102 may verify the validity of the digital signature by using a public key corresponding to the private key of the software developer. If processing device 102 determines that the tamper proof ID has a valid digital signature, then processing device 102 may provide an indication that execution of the executable software on processing device 102 is permitted (act 606). Otherwise, processing device 102 may provide an indication that execution of the executable software is not permitted on processing device 102 (act 608).

Figure 7:
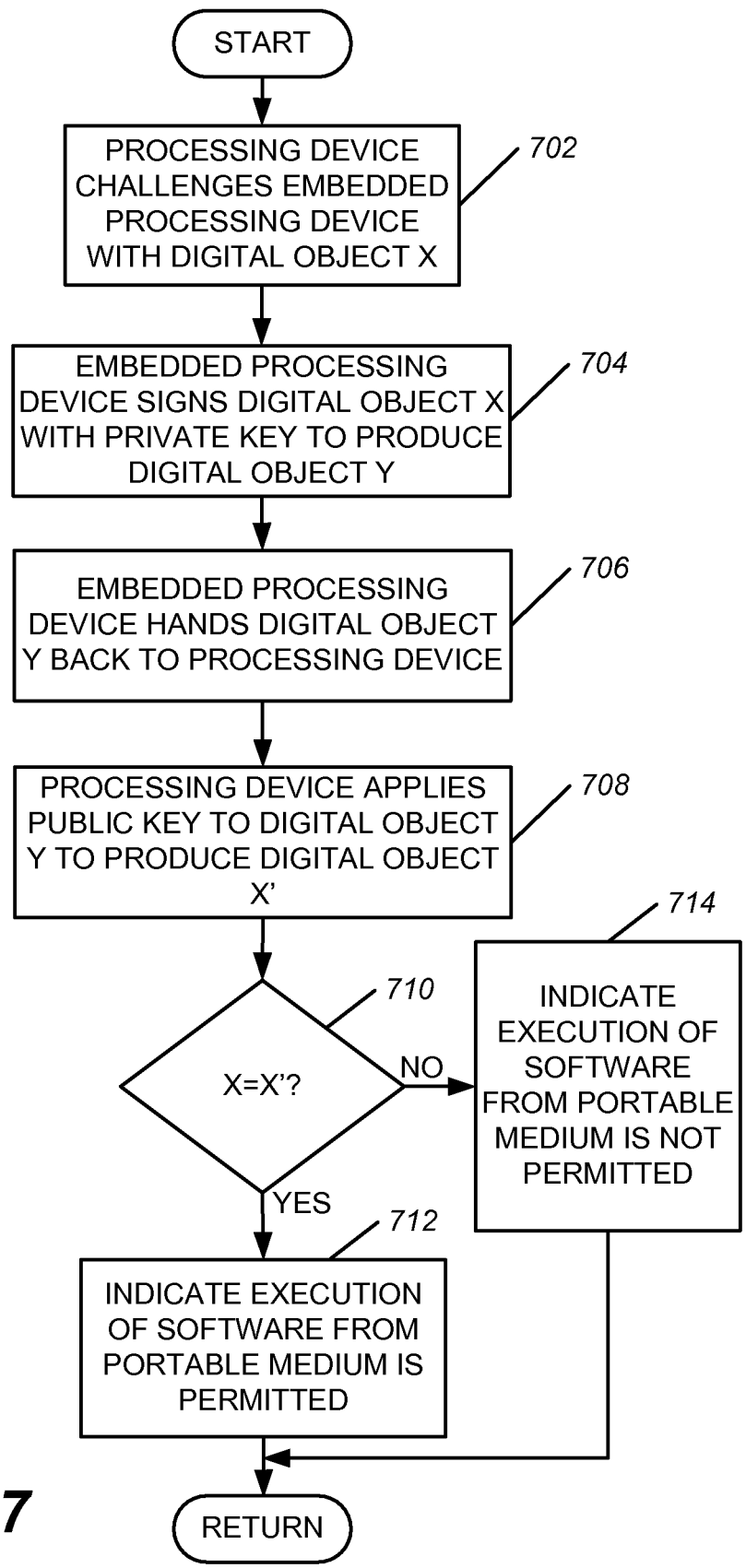

FIG. 7 is a flowchart illustrating a fourth exemplary method 302-4 for performing act 302 of FIG. 3. Executing a portion of the software from portable medium 104, processing device 102 may challenge embedded processing device 110 of portable medium 104 with a digital object X by calling into embedded processing device 110 (act 702). Embedded processing device 110 may sign the digital object X with a private key, which may be stored in a portion of portable medium 104 that is inaccessible to processing device 102, to produce a digital object Y (act 704). Embedded processing device 110 may then hand the digital object Y back to processing device 102 (act 706). Processing device 102 may then apply a public key, corresponding to the private key, to the digital object Y to produce a digital object X' (act 708). Processing device 102 may then determine whether the digital object Y was signed with a valid private key by comparing the digital object X' with the digital object X (act 710). If processing device 102 determines that the digital object X equals the digital object X', then the digital object Y was signed with the valid private key and processing device 102 may provide an indication that execution of the executable software from portable medium 104 is permitted (act 712). Otherwise, processing device 102 may provide an indication that execution of the executable software from portable medium 104 is not permitted (act 714).

Figure 8:
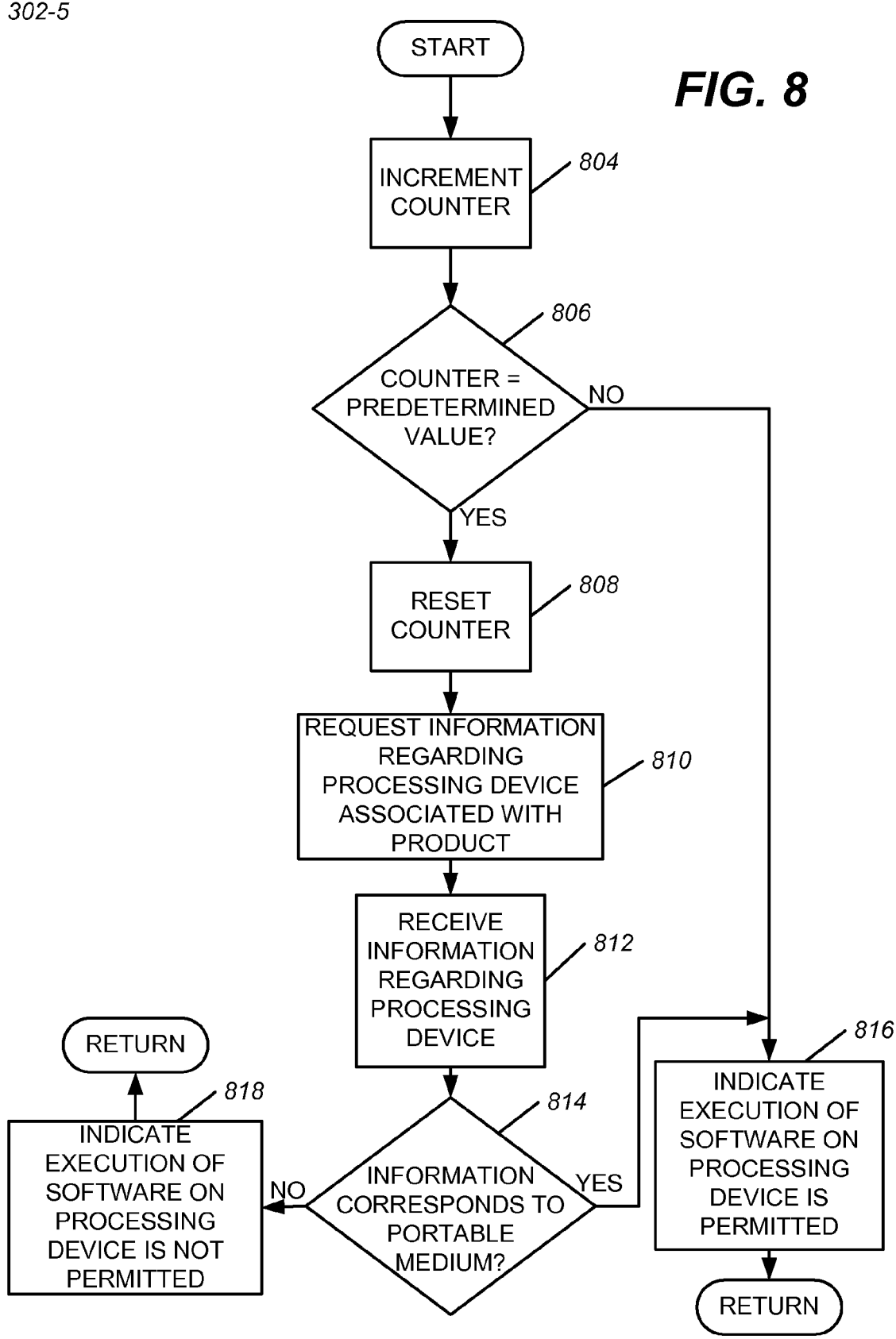

FIG. 8 is a flowchart illustrating a fifth exemplary embodiment 302-5 for performing act 302 FIG. 3. This embodiment assumes that before executing the executable software, the executable software may be activated by processing device 102 sending information concerning a product, including the executable software, and information concerning processing device 102 to a server, such as, for example, server 106. In such an embodiment, server 106 may be responsible for recording information concerning products and processing devices executing the products, thereby associating the processing devices with the products. In this embodiment, after every predetermined number of executions of the executable software, processing device 102 may request the information regarding a processing device associated with a product, including the executable software. In one embodiment, processing device 102 may send a product key to server 106 when requesting information regarding the processing device associated with the product. Processing device 102 may permit execution of the executable software on processing device 102 if received information, corresponding to the requested information, corresponds to previously stored information in portable medium 104.

Executing the portion of the software from portable medium 104, processing device 102 may increment a counter (act 804) to count a number of executions of the executable software. In some embodiments, the counter may initially be set to zero. Next, processing device 102 may determine whether the counter equals a predetermined value (act 806). The predetermined value may be 40, 100, or another value.

If processing device 102 determines that the counter equals the predetermined value, then processing device 102 may reset the counter (act 808). Processing device 102 may then access a server, such as, for example, server 106, via a network, such as, for example, network 108, to request information regarding a processing device associated with the product, including the executable software (act 810). Processing device 102 may then receive the requested information regarding the processing device (act 812). Processing device 102 may then determine whether the received requested information corresponds to previously stored information in portable medium 104 (act 814). The stored information in portable medium 104 may include, for example, information identifying processing device 102, information identifying the executable software, unique information identifying portable medium 104, and/or other information. If the received requested information corresponds to the stored information in portable medium 104, then processing device 102 may provide an indication that execution of the executable software on processing device 102 is permitted (act 816). Otherwise, processing device 102 may provide an indication that execution of the executable software on processing device 102 is not permitted (act 818).

Figure 9:
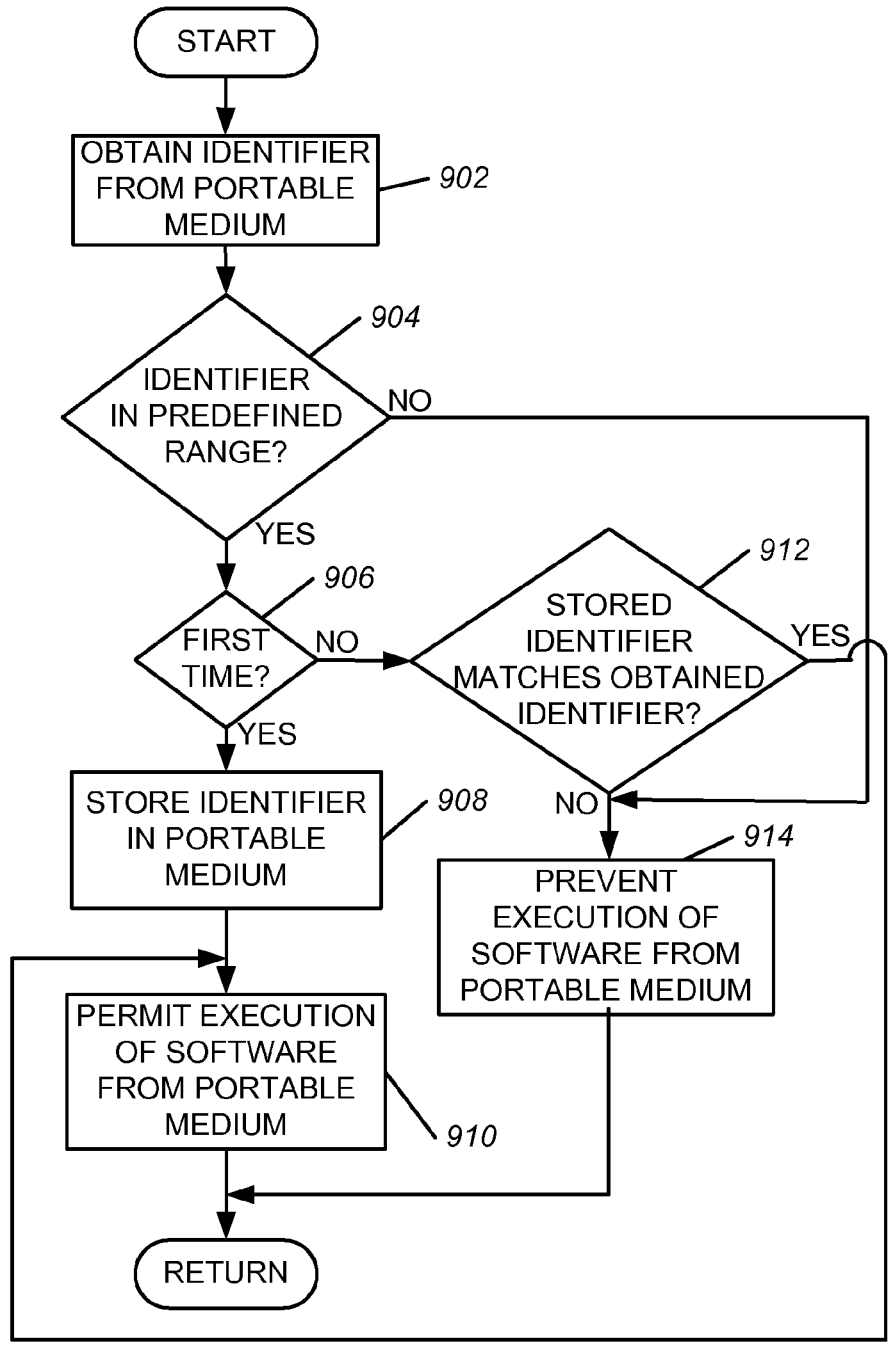

FIG. 9 is a flowchart illustrating a sixth exemplary embodiment 302-6 for performing act 302 of FIG. 3. Processing device 102 may execute the portion of the software stored on portable medium 104, thereby causing processing device 102 to access an identifier with respect to portable medium 104 (act 902). In some embodiments, the identifier may be a unique identifier.

Processing device 102 may then determine whether the identifier is within a predefined range (act 904). If processing device 102 determines that the identifier is within the predefined range, then processing device 102 may then determine whether this is a first attempt to execute the executable software stored in portable medium 104 (act 906). If processing device 102 determines that this is the first attempt to execute the executable software stored in portable medium 104, then processing device 102 may store the identifier in portable medium 104 (act 908). In some embodiments, the identifier may be stored in encrypted form in portable medium 104. Processing device 102 may then provide an indication that execution of the executable software from portable medium 104 is permitted (act 910).

If, during act 904, processing device 102 determines that the identifier is not within the predetermined range, then processing device 102 may provide an indication that execution of the executable software from portable medium 104 is to be prevented (act 914).

If, during act 906, processing device 102 determines that this is not a first attempt to execute the executable software stored in portable medium 104, then processing device 102 may determine whether the stored identifier matches the obtained identifier from portable medium 104 (act 912). If the stored identifier matches the obtained identifier from portable medium 104, then processing device 102 may proceed to act 910 to provide an indicator to indicate that execution of the executable software from portable medium 104 is permitted. Otherwise, processing device 102 may provide an indication that execution of the executable software from portable medium 104 is to be prevented (act 914).

Figure 10:
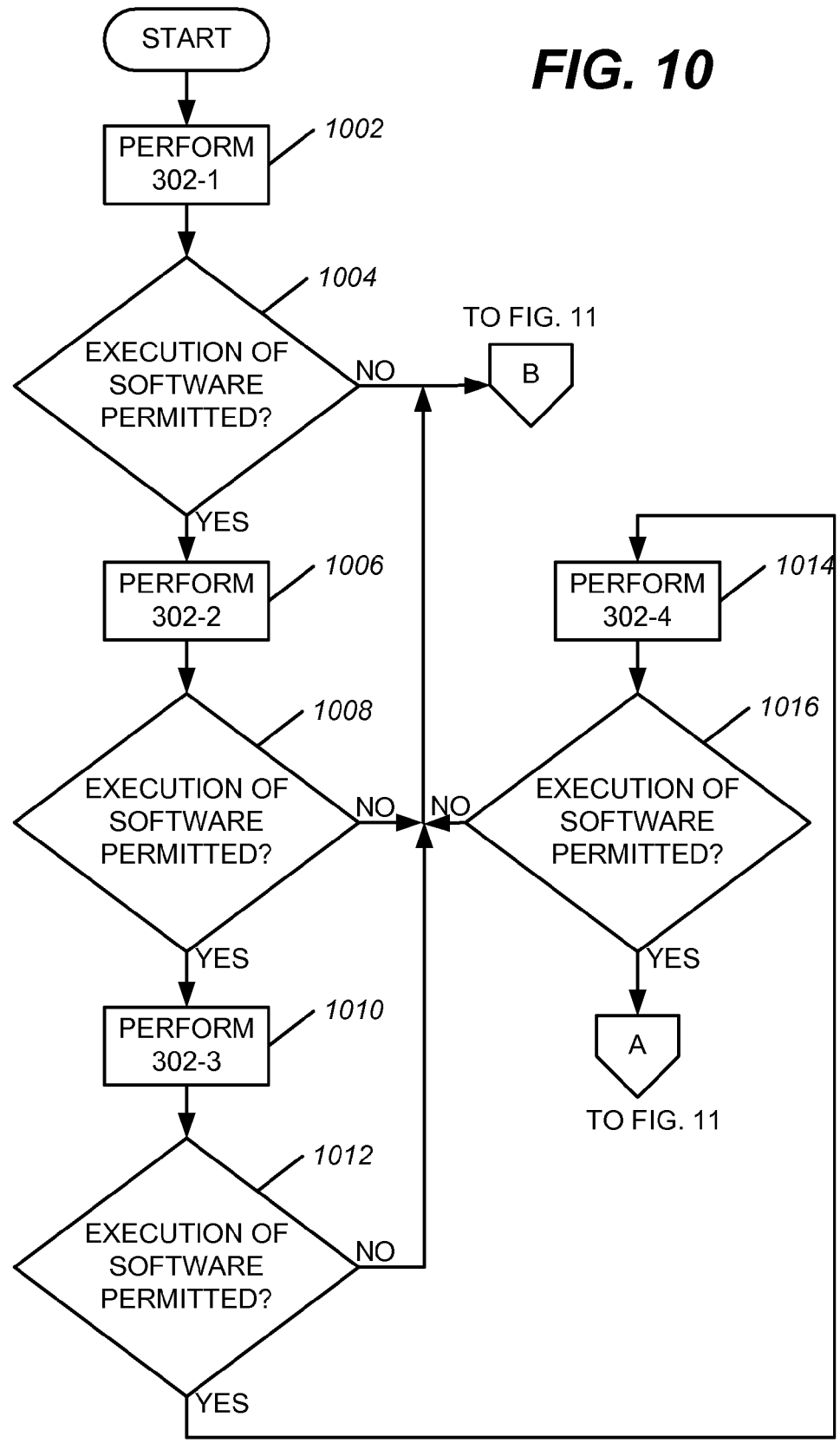
Figure 11:
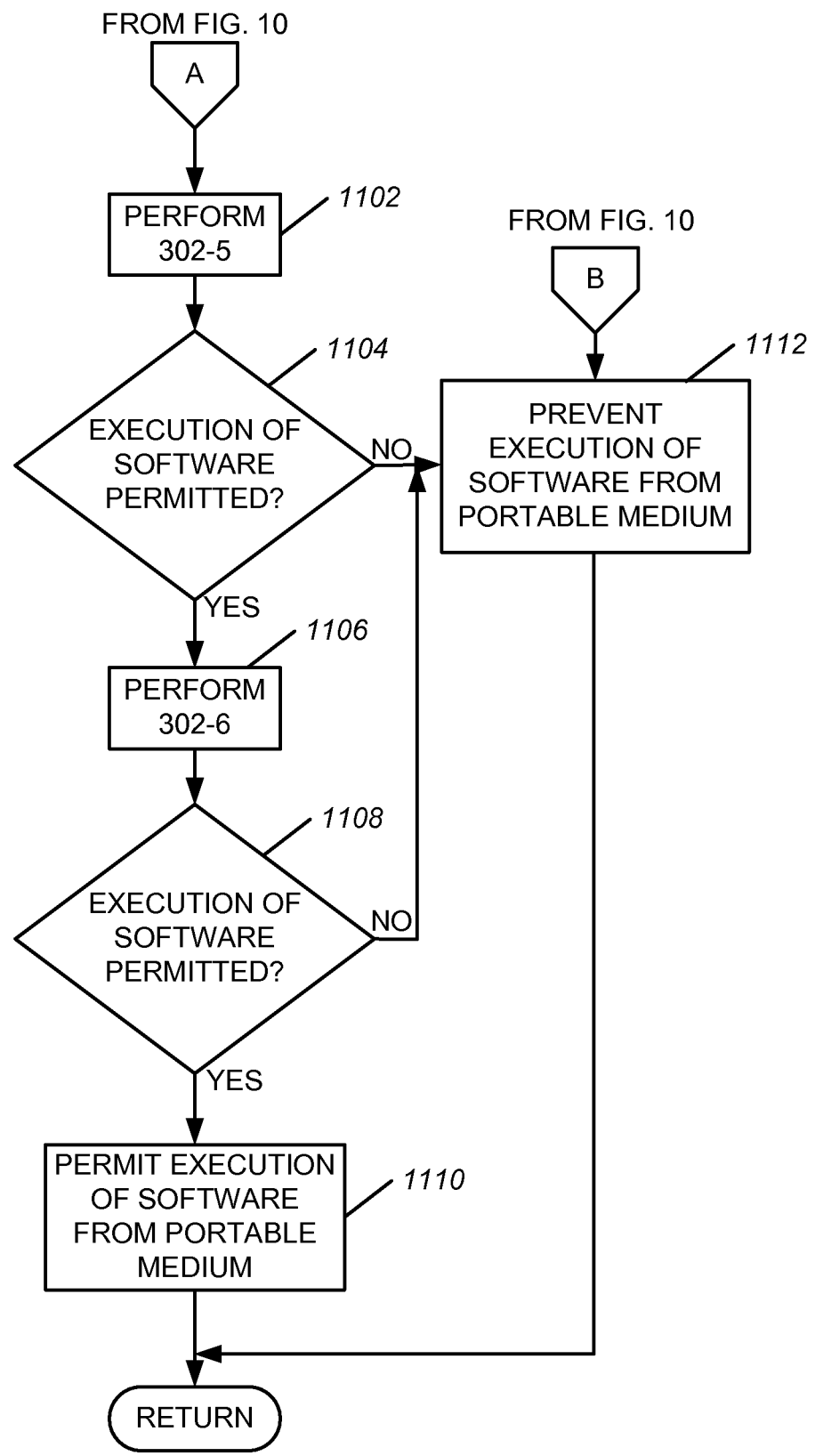

FIGS. 10-11 include a flowchart for explaining exemplary processing in an embodiment which combines the processing of methods 302-1 through 302-6. According to the flowchart of FIG. 10, processing device 102 may execute the portion of the software from portable medium 104, which may cause processing device 102 to perform method 302-1 (FIG. 4) (act 1002).

Processing device 102 may then determine, based on the indication from performing method 302-1, whether execution of the executable software from portable medium 104 is permitted (act 1004). If processing device 102 determines that execution of the executable software from portable medium 104 is not permitted, then processing device 102 may provide an indication that execution of the executable software from portable medium 104 is to be prevented (act 1112; FIG. 11).

If, during act 1004, processing device 102 determines that execution of the executable software is to be permitted, then processing device 102 may perform method 302-2 (FIG. 5) (act 1006; FIG. 10). Processing device 102 may then determine, based on the indication from performing method 302-2, whether execution of the executable software from portable medium 104 is permitted (act 1008). If processing device 102 determines that execution of the executable software from portable medium 104 is not permitted, then processing device 102 may provide an indication that execution of the executable software from portable medium 104 is to be prevented (act 1112; FIG. 11).

If, during act 1008, processing device 102 determines that execution of the executable software is to be permitted, then processing device 102 may perform method 302-3 (FIG. 6) (act 1010; FIG. 10). Processing device 102 may then determine, based on the indication from performing 302-3, whether execution of the executable software from portable medium 104 is permitted (act 1012). If processing device 102 determines that execution of the executable software from portable medium 104 is not permitted, then processing device 102 may provide an indication that execution of the executable software from portable medium 104 is to be prevented (act 1112; FIG. 11).

If, during act 1012, processing device 102 determines that execution of the executable software is to be permitted, then processing device 102 may perform 302-4 (FIG. 7) (act 1014; FIG. 10). Processing device 102 may then determine, based on the indication from performing method 302-4, whether execution of the executable software from portable medium 104 is permitted (act 1016). If processing device 102 determines that execution of the executable software from portable medium 104 is not permitted, then processing device 102 may provide an indication that execution of the executable software from portable medium 104 is to be prevented (act 1112; FIG. 11).

If, during act 1016, processing device 102 determines that execution of the executable software is to be permitted, then processing device 102 may perform method 302-5 (FIG. 8) (act 1102; FIG. 11). Processing device 102 may then determine, based on the indication from performing method 302-5, whether execution of the executable software from portable medium 104 is permitted (act 1104). If processing device 102 determines that execution of the executable software from portable medium 104 is not permitted, then processing device 102 may provide an indication that execution of the executable software from portable medium 104 is to be prevented (act 1112).

If, during act 1104, processing device 102 determines that execution of the executable software is to be permitted, then processing device 102 may perform method 302-6 (FIG. 6) (act 1106). Processing device 102 may then determine, based on an indication from performing 302-6, whether execution of the executable software from portable medium 104 is permitted (act 1108). If processing device 102 determines that execution of the executable software from portable medium 104 is not permitted, then processing device 102 may provide an indication that execution of the executable software from portable medium 104 is to be prevented (act 1112).

If, during act 1108, processing device 102 determines that execution of the executable software is to be permitted, then processing device 102 may provide an indication that execution of the executable software from portable medium 104 is permitted (act 1110).

Returning to FIG. 3, after performing act 302, processing device 102 may check the provided indication to determine whether execution of the executable software stored on portable medium 102 is permitted (act 304). If processing device 102 determines that execution of the executable software stored on portable medium 102 is not permitted, then processing device 102 may alter behavior of the executable software with respect to processing device 102 (act 306). In one embodiment, altering the behavior of the executable software may include preventing execution of the executable software on processing device 102, or enabling only a limited set of functions of the executable software.

If, during act 304, processing device 102 determines that execution of the executable software stored on portable medium 102 is permitted, then processing device 102 may obtain information regarding characteristics of portable medium 102 (act 308). The characteristics may include information with respect to type of media, brand of media, speed of media, media storage capacity, media features (for example, encryption permitted, public/private keys, or other or different features), or other information.

Processing device 102 may then determine whether to limit functionality of the executable software stored on portable medium 104 (act 310). For example, processing device 102 may not execute the executable software from certain types of portable medium, such as a secure digital (SD) card, or other device for which software drivers of processing device 102 may not support full functionality. On certain media which may have a read or write speed slower than a predetermined speed, processing device 102 may limit reads from and writes to the media. Processing device 102, in some embodiments, may not execute the executable software from portable medium 104, when portable medium 104 is a multimedia card (MMC) due to lack of security on the MMC card. When portable medium 104 has storage capacity less than a predetermined amount, processing device 102 may not be able to perform certain functions such as, for example, paging or hibernation, or other or different functions. The above examples of limited functionality are only exemplary. In other embodiments, additional, different, or other limited functionality may be implemented based on different or other characteristics of portable medium 104.

If the functionality is to be limited due to one or more characteristics of portable medium 104, then the executable software may be executed from portable medium 104 with the limited changed functionality (assuming the limited functionality permits execution, otherwise execution is not permitted) (act 314). If the functionality is not to be limited, then processing device 102 may permit execution of the executable software from portable medium 104 without limited functionality (act 312).

The processing illustrated by the flowcharts of FIGS. 3-11 is only exemplary. Other embodiments consistent with the subject matter of this disclosure may perform different or additional processing.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A machine-implemented method for preventing unauthorized use of executable software stored on a rewritable removable medium, the machine-implemented method comprising:

executing, by a host processing device to which the rewritable removable medium is removably attached, a first portion of the executable software directly from the rewritable removable medium without installing the first portion of the executable software on the host processing device in order to obtain information from the rewritable removable medium, wherein the obtained information includes at least one of a type of the rewritable removable medium, a brand of the rewritable removable medium, a manufacturer of the rewritable removable medium, or an identifier of the rewritable removable medium;

determining, by the host processing device, whether execution of a second portion of the executable software directly from the rewritable removable medium is permitted based on the information obtained from the rewritable removable medium, the determining whether execution of the second portion of the executable software directly from the rewritable removable medium is permitted further comprises:

submitting, by the host processing device to an embedded processing device of the rewritable removable medium, an unsigned data object for the embedded processing device to sign with a private key, wherein the private key is inaccessible to the host processing device;

receiving, by the host processing device, the signed copy of the data object from the embedded processing;

processing the received signed copy of the data object with a public key that is accessible to the host processing device;

comparing the unsigned copy of the data object to the processed signed copy of the data object; and determining, by the host processing device, whether the execution of the second portion of the executable software directly from the rewritable removable medium is permitted based on the at least one determined type of the rewritable removable medium, the brand of the rewritable removable medium, the manufacturer of the rewritable removable medium, or the identifier of the rewritable removable medium; and selectively executing, by the host processing device, the second portion of the executable software with unaltered behavior directly from the rewritable removable medium based on the comparison of the unsigned copy of the data object to the processed signed copy of the data object.

2. The machine-implemented method of claim 1, wherein:
the obtained information also includes at least one characteristic of the rewritable removable medium, and
the determining, by the host processing device, whether execution of the second portion of the executable software directly from the rewritable removable medium is permitted further comprises:
determining, by the host processing device, whether the execution of the second portion of the executable software directly from the rewritable removable medium is permitted based also on the at least one determined characteristic of the rewritable removable medium.

3. The machine-implemented method of claim 1, wherein the at least one characteristic includes at least one of a speed of the rewritable removable medium, a security feature of the rewritable removable medium, or a storage capacity of the rewritable removable medium.

4. The machine-implemented method of claim 1, further comprising:
sending, by the host processing device to a server computing device, information identifying a product including the second portion of the executable software stored on the rewritable removable medium; and
receiving, by the host processing device, a response from the server computing device in response to the sending of the information to the server computing device, wherein
the determining, by the host processing device, whether execution of the second portion of the executable software directly from the rewritable removable medium is permitted further comprises:
determining, by the host processing device, whether the execution of the second portion of the executable software directly from the rewritable removable medium is permitted based also on the received response from the server computing device.

5. The machine-implemented method of claim 1, further comprising:
determining at least one characteristic of the host processing device to which the rewritable removable medium is currently associated, and
determining whether the execution, by the host processing device, of the second portion of the executable software stored on the rewritable removable medium is permitted based also on the at least one characteristic of the host processing device.

6. The machine-implemented method of claim 1, further comprising:
extracting, from the host processing device to which the rewritable removable medium is removably attached, information for identifying the host processing device, and
determining whether the execution of the second portion of the executable software stored on the rewritable removable medium is permitted based also on the information for identifying the host processing device.

7. The machine-implemented method of claim 1, further comprising:
verifying an existence of a valid tamper proof identifier on the host processing device to which the rewritable removable medium is currently associated, and
determining whether the execution, by the host processing device, of the second portion of the executable software stored on the rewritable removable medium is permitted based also on the verifying of the existence of the valid tamper proof identifier on the host processing device.

8. The machine-implemented method of claim 1, further comprising:
altering functionality of the second portion of the executable software based, at least in part, on at least one determined characteristic of the rewritable removable medium included in the obtained information.

9. A portable machine-readable storage medium having executable software recorded thereon, a first portion of the executable software comprising:
instructions for a processing device to obtain information from the portable machine-readable medium while the portable machine-readable storage medium is removably attached to the processing device, wherein the obtained information includes at least one of a type of the portable machine-readable medium, a brand of the portable machine-readable medium, a manufacturer of the portable machine-readable medium, or an identifier of the portable machine-readable medium;
instructions for the processing device to determine whether a second portion of the executable software stored on the portable machine-readable storage medium is permitted to be executed by the processing device based on the obtained information from the portable machine-readable storage medium, the instructions for the processing device to determine whether the second portion of the executable software stored on the portable machine-readable storage medium is permitted to be executed by the processing device further comprises:
instructions for the processing device to submit an unsigned data object to an embedded processing device of the portable machine-readable storage medium for the embedded processing device to sign with a private key that is inaccessible to the processing device;
instructions for the processing device to receive the signed copy of the data object from the embedded processing device;
instructions for the processing device to process the received signed copy of the data object with a public key that is accessible to the processing device;

instructions for the processing device to compare the unsigned copy of the data object to the processed signed copy of the data object; and instructions for the processing device to determine whether the execution of the second portion of the executable software directly from the portable machine-readable medium is permitted based on the at least one determined type of the portable machine-readable medium, the brand of the portable machine-readable medium, the manufacturer of the portable machine-readable medium, or the identifier of the portable machine-readable medium; and instructions for the processing device to permit selective execution of the second portion of the executable software, with unaltered behavior, if the execution of the second portion of the executable software stored on the portable machine-readable storage medium is determined, by the processing device, to be permitted based on the comparison of the unsigned copy of the data object to the processed signed copy of the data object, the second portion of the executable software stored on the portable machine-readable storage medium being arranged to be executed, by the processing device, directly from the portable machine-readable storage medium.

10. The portable machine-readable storage medium of claim 9, wherein:

the obtained information also includes a characteristic of the portable machine-readable storage medium, and the instructions for the processing device to determine whether the second portion of executable software stored on the portable machine-readable storage medium is permitted to be executed by the processing device based also on the obtained information from the portable machine-readable medium further comprises:

instructions for the processing device to determine whether the characteristic of the portable machine-readable storage medium has a specific value or has a value within a predetermined range, execution of the second portion of the executable software with the unaltered behavior to be permitted only when the characteristic of the portable machine-readable storage medium has the specific value or has the value within the predetermined range.

11. The portable machine-readable medium of claim 9, wherein the first portion of the executable software further comprises:

instructions for the processing device to send product information to a server, instructions for receiving, by the processing device, a server response responsive to the sending of the product information, and instructions for determining, by the processing device, whether the second portion of the executable software stored on the portable machine-readable storage medium is permitted to be executed by the processing device based also on the received server response.

12. The portable machine-readable storage medium of claim 9, wherein the instructions for the at least one processor of the host processing device to compare the unsigned copy of the data object to the processed signed copy of the data object are instructions for the processing device to determine whether the signed copy of the data object has a valid signature that indicates that the execution of the first portion of the executable software stored on the portable machine-readable storage medium is permitted, with unaltered behavior, by the processing device.

13. The portable machine-readable storage medium of claim 9, wherein:

the obtained information also includes previously-stored processing device information, and the instructions for the processing device to determine whether the second portion of the executable software stored on the portable machine-readable storage medium is permitted to be executed by the processing device based on the obtained information from the portable machine-readable medium further comprise:

instructions for the processing device to determine whether previously-stored processing device information included on the portable machine-readable storage medium matches information regarding the processing device, the second portion of the executable software stored on the portable machine-readable storage medium being determined to be permitted to be executed, with the unaltered behavior, by the processing device if the previously-stored processing device information included in the obtained information matches the information regarding the processing device.

14. The portable machine-readable storage medium of claim 9, further comprising:

instructions for determining at least one characteristic of the portable machine-readable storage medium, and instructions for altering functionality of the second portion of the executable software based on the at least one determined characteristic of the portable machine-readable storage medium.

15. The portable machine-readable storage medium of claim 9, further comprising:

instructions for determining at least one characteristic of the portable machine-readable storage medium, and instructions for altering functionality of the second portion of the executable software based on the at least one determined characteristic of the portable machine-readable storage medium, wherein the at least one characteristic includes at least one of a speed of the portable machine-readable storage medium, a security feature of the portable machine-readable storage medium, or a storage capacity of the portable machine-readable storage medium.

16. A portable machine-readable and machine-writable storage medium having executable software recorded thereon for at least one processor of a host processing device, a first portion of the executable software comprising:

instructions, for the at least one processor of the host processing device to which the portable machine-readable and machine writable storage medium is removably attached, to obtain information from the portable machine-readable and machine writable storage medium, the first portion of the executable software stored on the portable machine-readable and machine-writable storage medium being arranged to be executed directly by the at least one processor of the host processing device without installing the first portion of the executable software on the host processing device, wherein the obtained information includes at least one of a type of the portable machine-readable and machine writable storage medium, a brand of the portable machine-readable and machine writable storage medium, a manufacturer of the portable machine-readable and machine writable storage medium, or an identifier of the portable machine-readable and machine writable storage medium;

instructions for determining at least one characteristic of the portable machine-readable and machine-writable storage medium based on the obtained type of the portable machine-readable and machine writable storage medium, brand of the portable machine-readable and machine writable storage medium, manufacturer of the portable machine-readable and machine writable storage medium, and/or identifier of the portable machine-readable and machine writable storage medium;

instructions for the at least one processor of the host processing device to submit an unsigned data object to an embedded processing device of the portable machine-readable and machine-writable storage medium for signing of the data object with a private key that is inaccessible to the processing device by the embedded processing device of the portable machine-readable and machine-writable storage medium;

instructions for the at least one processor of the host processing device to receive a signed copy of the data object from the embedded processing device of the portable machine-readable and machine-writable storage medium, in response to submitting the data object to the embedded processing device;

instructions for the at least one processor of the host processing device to process the signed copy of the data object with a public key that is accessible to the host processing device;

instructions for the at least one processor of the host processing device to compare the unsigned copy of the data object to the processed signed copy of the data object; and instructions for the at least one processor of the host processing device to selectively alter a functionality of a second portion of the executable software based on the determined at least one characteristic of the portable machine-readable and machine-writable storage medium and on the comparison of the unsigned copy of the data object to the processed signed copy of the data object.

17. The portable machine-readable and machine-writable storage medium of claim 16, wherein the instructions for the at least one processor of the host processing device to selectively alter the functionality of the second portion of the executable software further comprise:

instructions for the at least one processor of the host processing device to prevent execution of the second portion of the executable software.

18. The portable machine-readable and machine-writable storage medium of claim 16, wherein the instructions for the at least one processor of the host processing device to selectively alter the functionality of the second portion of the executable software further comprises:

instructions for the at least one processor of the host processing device to permit execution of some functions of the second portion of the executable software, and instructions for the at least one processor of the host processing device to prevent execution of other functions of the second portion of the executable software.

19. The portable machine-readable and machine-writable storage medium of claim 16, further comprising:

instructions for the at least one processor of the host processing device to verify an existence of a valid tamper proof identifier associated with the host processing device; and instructions for preventing the executing of the second portion of the executable software by the at least one processor of the host processing device as a result of a failure to verify the existence of the valid tamper proof identifier.

20. The portable machine-readable and machine-writable storage medium of claim 16, further comprising:

instructions for the at least one processor of the host processing device to determine a speed of reading and writing with respect to the portable machine-readable and machine-writable storage medium; and instructions for the at least one processor of the host processing device to limit a speed of execution of instructions of the second portion of the executable software based, at least in part, on the determined speed of reading and writing with respect to the portable machine-readable and machine-writable storage medium.

* * * * *